(12) United States Patent
MacFarlane

(10) Patent No.: US 9,038,399 B2
(45) Date of Patent: May 26, 2015

(54) SYSTEMS AND METHODS FOR DRIVING AN OIL COOLING FAN OF A GAS TURBINE ENGINE

(75) Inventor: Ian A. MacFarlane, St-Bruno (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 387 days.

(21) Appl. No.: 13/602,395

(22) Filed: Sep. 4, 2012

(65) Prior Publication Data

US 2014/0060074 A1 Mar. 6, 2014

(51) Int. Cl.
F02C 6/08 (2006.01)
F02C 7/00 (2006.01)
F02C 6/04 (2006.01)
F02C 7/14 (2006.01)

(52) U.S. Cl.
CPC ............... F02C 7/14 (2013.01); *Y02T 50/671* (2013.01); *Y02T 50/675* (2013.01)

(58) Field of Classification Search
CPC .............. F02C 7/18; F02C 7/185; F02C 6/08; F02C 6/18; F02C 6/02; F02C 9/42; Y02E 20/18; Y02E 20/16; Y02E 20/14
USPC .......................... 60/782, 783, 784, 785, 39.15
See application file for complete search history.

(56) References Cited

U.S. PATENT DOCUMENTS

| | | | |
|---|---|---|---|
| 3,791,682 A * | 2/1974 | Mitchell | 290/2 |
| 3,894,521 A | 7/1975 | Sakasegawa et al. | |
| 4,441,462 A | 4/1984 | Budinski | |
| 5,989,151 A | 11/1999 | Kershaw et al. | |
| 6,070,560 A | 6/2000 | Johnston et al. | |
| 6,807,926 B2 | 10/2004 | Shiozaki et al. | |
| 7,448,198 B2 * | 11/2008 | Trumper et al. | 60/204 |
| 7,552,591 B2 | 6/2009 | Bart et al. | |
| 7,810,332 B2 | 10/2010 | Olmes et al. | |
| 7,854,582 B2 | 12/2010 | Ullyott | |
| 7,918,194 B2 | 4/2011 | Kojima | |
| 7,938,214 B2 | 5/2011 | Telakowski | |
| 7,952,244 B2 | 5/2011 | Colin | |
| 8,015,954 B2 | 9/2011 | Kardos | |
| 2003/0033812 A1 | 2/2003 | Gerdes et al. | |
| 2009/0107657 A1 | 4/2009 | Montminy et al. | |
| 2010/0101233 A1 | 4/2010 | Evans-Beauchamp | |
| 2010/0275644 A1 | 11/2010 | Koganezawa et al. | |
| 2011/0132292 A1 | 6/2011 | Schwartz et al. | |

FOREIGN PATENT DOCUMENTS

| | | | |
|---|---|---|---|
| JP | 2003239741 A | 8/2003 | |
| JP | 2005030363 A | 2/2005 | |

\* cited by examiner

*Primary Examiner* — Ehud Gatenberg
*Assistant Examiner* — Jared W Pike
(74) *Attorney, Agent, or Firm* — Norton Rose Fulbright Canada LLP

(57) ABSTRACT

Systems and methods for driving an oil cooling fan (36) of a gas turbine engine (10) during different modes of operation of the gas turbine engine (10) are described. A system may include a coupling device (40) configured to: transmit motive power from a power turbine shaft (22) of the gas turbine engine (10) to the oil cooling fan (36) during a first mode of operation where the power turbine shaft (22) is turning, and to decouple the oil cooling fan (36) from the power turbine shaft (22) during a second mode of operation where the power turbine shaft (22) is prevented from turning. An alternate source (42) of motive power may be configured to drive the oil cooling fan (36) during the second mode of operation.

17 Claims, 3 Drawing Sheets

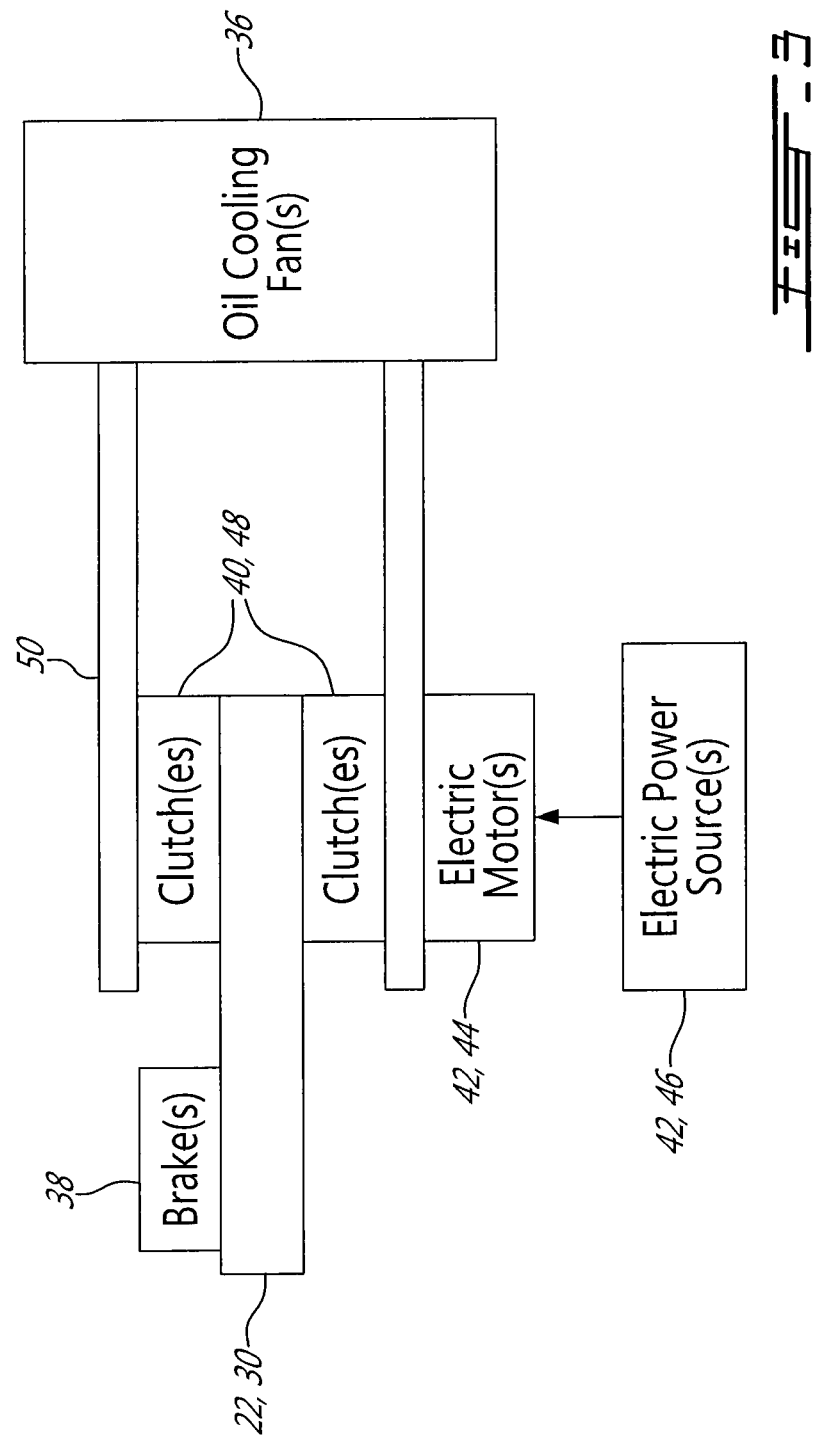

SYSTEMS AND METHODS FOR DRIVING AN OIL COOLING FAN OF A GAS TURBINE ENGINE

TECHNICAL FIELD

The following disclosure relates generally to driving accessories of gas turbine engines, and more particularly to driving an oil cooling fan during different modes of operation of a gas turbine engine.

BACKGROUND OF THE ART

Gas turbine engines typically have oil systems that serve to lubricate, cool and clean bearings and/or gears of such engines. In aircraft applications, such as fixed-wing aircraft with one or more propellers driven by one or more gas turbine engines, oil systems can also serve to supply oil to the propeller system(s). The oil system of a gas turbine engine can include one or more cooling fans that can assist in removing heat from oil being circulated through various parts of the engine.

Gas turbine engines can also include different modes of operation. In aircraft applications for example, gas turbine applications can have different modes of operation depending on, for example, whether the aircraft is in flight or on the ground. During the different modes of operation, it can be desirable or necessary to drive the oil cooling fan. However, existing systems and methods that are configured to drive the oil cooling fan throughout the different modes of operation of a gas turbine engine can often result in compromising the efficiency of the engine during some modes of operation.

Improvement in driving an oil cooling fan of a gas turbine engine is therefore desired.

SUMMARY

The disclosure describes systems, devices, and processes for driving accessories of gas turbine engines. In various aspects, for example, the disclosure describes systems, devices, and processes useful in driving oil cooling fans of gas turbine engines during different modes of operation of such engines.

Thus, in one aspect, the disclosure describes a system for driving an oil cooling fan of a gas turbine engine. The system may comprise:
 a coupling device configured to:
  transmit motive power from a power turbine shaft of the gas turbine engine to the oil cooling fan during a first mode of operation where the power turbine shaft is turning, and to
  decouple the oil cooling fan from the power turbine shaft during a second mode of operation where the power turbine shaft is prevented from turning; and
 an alternate source of motive power configured to drive the oil cooling fan during the second mode of operation.

In a further aspect, the disclosure describes a gas turbine engine. The gas turbine engine may comprise:
 at least one power turbine coupled to a power turbine shaft;
 an oil cooler including an oil cooling fan;
 a coupling device configured to:
  transmit motive power from the power turbine shaft of the gas turbine engine to the oil cooling fan during a first mode of operation where the power turbine shaft is turning, and to
  decouple the oil cooling fan from the power turbine shaft during a second mode of operation where the power turbine shaft is prevented from turning; and
 an alternate source of motive power configured to drive the oil cooling fan during the second mode of operation.

For example, in various embodiments the second mode of operation may comprise a hotel mode where the power turbine shaft is locked.

In a further aspect, the disclosure describes a method for driving an oil cooling fan of an oil cooler of a gas turbine engine. The method may comprise:
 driving the oil cooling fan using motive power extracted from a power turbine shaft of the gas turbine engine during a first mode of operation where the power turbine shaft is turning; and
 driving the oil cooling fan using motive power from an alternate source during a second mode of operation where the power turbine shaft is prevented from turning.

Further details of these and other aspects of the subject matter of this application will be apparent from the detailed description and drawings included below.

DESCRIPTION OF THE DRAWINGS

Reference is now made to the accompanying drawings, in which:

FIG. 3 schematically shows an exemplary system for driving an oil cooling fan of a gas turbine engine according to a further embodiment.

DETAILED DESCRIPTION

Aspects of various embodiments are described through reference to the drawings.

Figure 1:
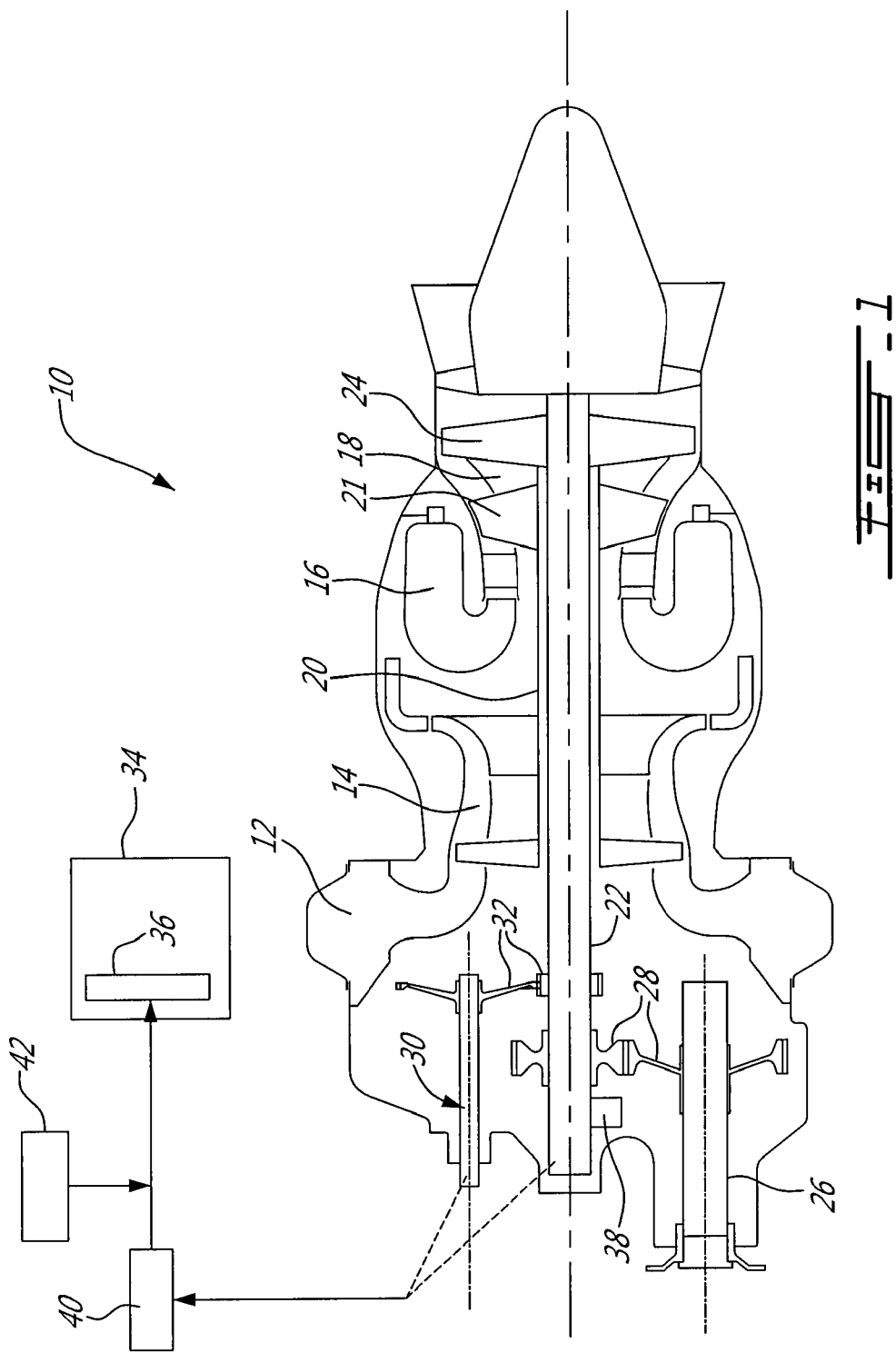
FIG. 1 schematically shows an axial cross-section view of a gas turbine engine having an exemplary system for driving an oil cooling fan.

FIG. 1 illustrates an exemplary gas turbine engine 10 including a system for driving an oil cooling fan during different modes of operation of gas turbine engine 10. Gas turbine engine 10 may be of a type suitable for use in subsonic flight, generally comprising in serial flow communication inlet 12 through which ambient air is received, multistage compressor 14 for pressurizing the air, combustor 16 in which the compressed air is mixed with fuel and ignited for generating an annular stream of hot combustion gases, and a turbine section 18 for extracting energy from the combustion gases. Turbine engine 10 may be of a type suitable for aircraft applications and may have a turboshaft or turboprop configuration. For example, turbine engine 10 may be used to power a helicopter main rotor or one or more propellers of a fixed-wing aircraft. Alternatively, turbine engine 10 may be used for ground-based industrial applications such as for power generation.

Gas turbine engine 10 may have a dual spool configuration but one skilled in the relevant arts will appreciate that engine 10 may not be limited to such configuration. For example, engine 10 may comprise high pressure spool(s) 20 including one or more stages of multistage compressor 14 and at least one high pressure turbine 21 of the turbine section 18. Engine 10 may also comprise power turbine shaft(s) 22 (i.e. low pressure spool) which may be driven by one or more power (i.e. low pressure) turbines 24 of turbine section 18. Power turbine shaft(s) 22 may be mechanically coupled to output shaft(s) 26 via gears 28, to which a mechanical load such as a propeller (not shown) and/or a main rotor (not shown) of an aircraft may be coupled. Gas turbine engine 10 may also comprise one or more accessory drive shafts 30 that may be used to drive various accessories of engine 10 such as one or more generators and/or oil pumps and/or other aircraft-related accessories. Accessory drive shaft(s) 30 may be driven by (e.g. mechanically coupled to) power turbine shaft(s) 22 via gears 32 or other suitable power-transfer means.

Gas turbine engine 10 may also comprise an oil system, which may serve to lubricate, cool and clean bearings and/or gears of engine 10. The oil system may also serve to supply oil to a propeller system, which may be coupled to gas turbine engine 10. The oil system may comprise oil cooler(s) 34, which may comprise one or more cooling fans 36. Cooling fan(s) 36 may assist in removing heat from oil being circulated through various parts of gas turbine engine 10.

Gas turbine engine 10 may also comprise brake(s) 38 configured to apply braking to power turbine shaft(s) 22 either directly or indirectly via intermediate component(s) during certain mode(s) of operation of gas turbine engine 10. For example, brake(s) 38 could instead or additionally apply braking to power turbine shaft(s) 22 via output shaft(s) 26 and or accessory drive shaft(s) 30. Brake(s) 38 may be of any suitable type(s) such as a friction-type brake. Brake(s) 38 may, for example, be used during a "hotel" (e.g. ground) mode of operation of an aircraft in order to lock or at least decrease the rotation speed of power turbine shaft(s) 22. Accordingly, during a hotel mode of operation of an aircraft, high pressure spool(s) 20 of gas turbine engine 10 may be allowed to run and provide air and power to various aircraft systems while a propeller or a main rotor of the aircraft driven by power turbine shaft(s) 22 may be prevented from spinning (e.g. rotor locked mode). For example, high pressure spool(s) 20 of gas turbine engine 10 may serve as an auxiliary power unit (APU) during hotel mode to power aircraft accessories while power turbine shaft(s) 22 may be locked. This feature may permit supplying power to systems of aircraft that do not have a separate APU while on the ground without having the propeller(s) or main rotor(s) spinning.

Gas turbine engine 10 may also comprise coupling device(s) 40 which may be used to drive oil cooling fan(s) 36 during mode(s) of operation where power turbine shaft(s) 22 is/are turning (e.g. modes other than hotel mode) by transmitting motive power from power turbine shaft(s) 22 to oil cooling fan(s) 36. Coupling device(s) 40 may comprise one or more clutches of suitable type(s) such as, for example, sprag, hydraulic and/or pneumatic clutch(es). Coupling device(s) 40 may serve to couple/decouple oil cooling fan(s) 36 to/from power turbine shaft(s) 22 as required. Alternate source(s) 42 of motive power may be used to drive oil cooling fan(s) 36 during hotel mode where braking may be applied to power turbine shaft(s) 22 and thereby cause power turbine shaft(s) 22 to be prevented from turning (e.g. locked and/or to spin at a reduced speed). Alternate source(s) 42 of motive power may include any suitable source of motive power other than power turbine shaft(s) 22 for driving oil cooling fan(s) 36. Accordingly, alternate source(s) 42 of motive power may include high pressure spool(s) 20. Power extracted from high pressure spool(s) 20 may be transferred directly or indirectly to cooling fan(s) 36. For example, alternate source(s) 42 may include one or more electric motor(s) 44 (shown in FIG. 2) powered by one or more generators driven by high pressure spool(s) 20. Alternatively, alternate source(s) 42 of motive power may include one or more electric motor(s) 44 powered by any suitable source of electrical power which may or may not be onboard an aircraft to which turbine engine 10 may be mounted.

Figure 2:
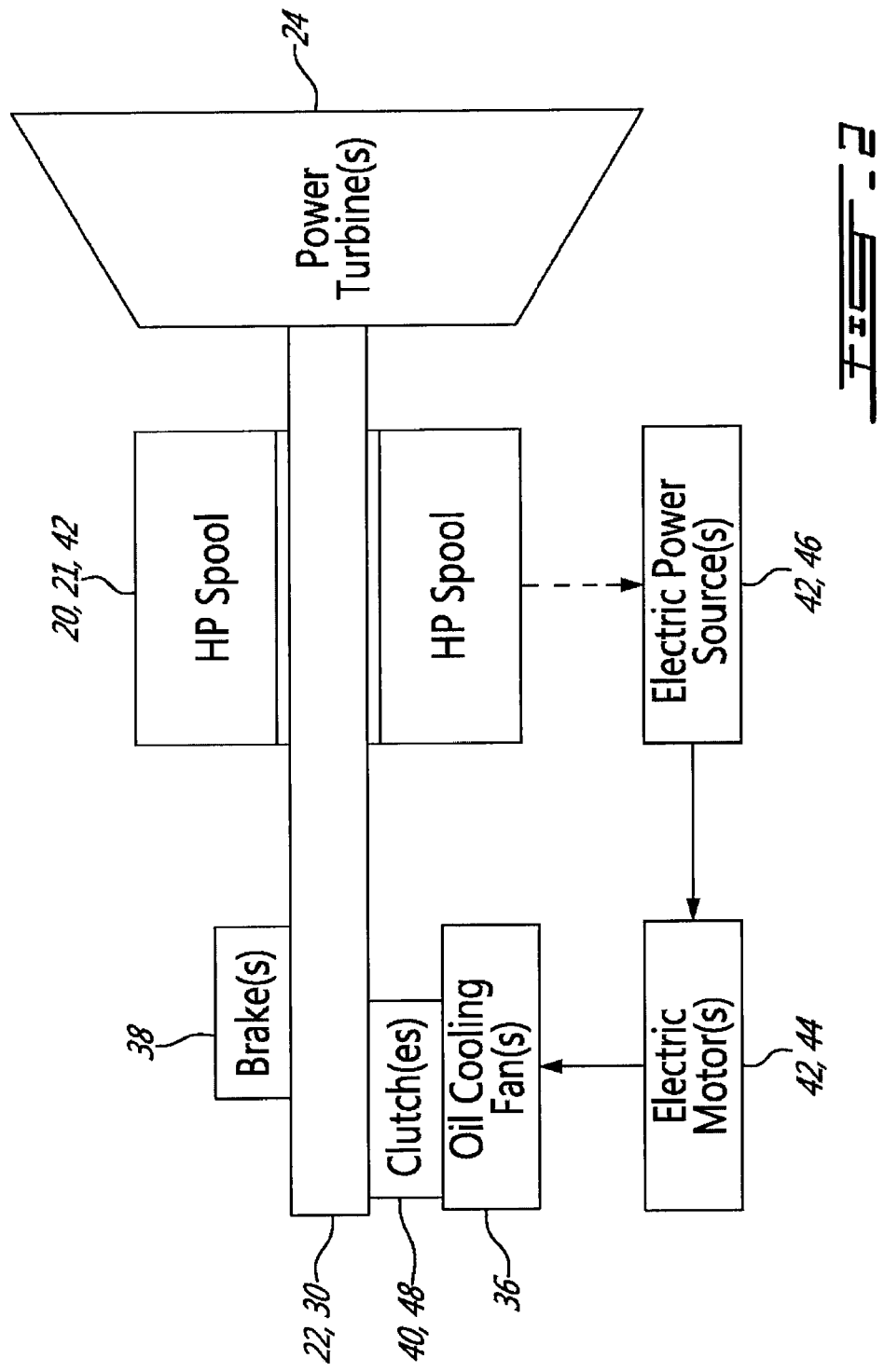
FIG. 2 schematically shows an exemplary system for driving an oil cooling fan of a gas turbine engine according to another embodiment.

FIG. 2 schematically illustrates another exemplary embodiment of a system for driving oil cooling fan(s) 36. As mentioned above, alternate source(s) 42 of motive power may include one or more electric motor(s) 42, 44 powered by electric power source(s) 46. Electric power source(s) 46 may include a generator that may be driven directly or indirectly by high pressure spool(s) 20 of gas turbine engine 10. Alternatively, electric power source(s) 42, 46 may be independent from high pressure spool(s) 20. Coupling device 40 may include clutch(es) 40, 48. Clutch(es) 40, 48 may be of any type(s) as described above suitable for coupling/decoupling oil cooling fan(s) 36 to/from power turbine shaft(s) 22 and/or accessory drive shaft(s) 30.

FIG. 3 schematically illustrates another exemplary embodiment of a system for driving oil cooling fan(s) 36. Power turbine shaft(s) 22 and/or accessory drive shaft(s) 30 may be disposed coaxially to fan drive shaft(s) 50. Fan drive shaft(s) 50 may be hollow and configured to accommodate therein a portion of power turbine shaft(s) 22 and/or accessory drive shaft(s) 30. Clutch(es) 40, 48 may be used to transfer motive power from power turbine shaft(s) 22 and/or accessory drive shaft(s) 30 in order to drive oil cooling fan(s) 36 when power turbine shaft(s) 22 is/are turning at an adequate speed (e.g. not in rotor locked mode). Electric motor (s) 42, 44 may be used to drive fan drive shaft(s) 50 when power turbine shaft(s) 22 is prevented from turning (e.g. during rotor locked mode) and fan drive shaft(s) 50 is/are no longer driven by (e.g. decoupled from) power turbine shaft(s) 22. Electric motor(s) 42, 44 may be powered by electric power source(s) 42, 46.

During operation, gas turbine engine 10 may, for example, be used in aircraft applications and may be used during various modes of operation of an aircraft (e.g. during flight/ ground operations). It may be more efficient and desirable, at least during certain modes of operation, to drive oil cooling fan(s) 36 using power extracted from power turbine shaft(s) 22 instead of from high pressure spool(s) 20. For example, it may result in more efficient operation of gas turbine engine 10 to extract power from power turbine shaft(s) 22 whenever possible (e.g. during flight and taxiing) as opposed to extracting power from high pressure spool(s) 20. However, during ground operation(s) where high pressure spool(s) 20 may be used as an APU to power various systems of the aircraft and while a propeller of the aircraft may be locked or spinning at a reduced speed due, for example, to braking being applied (e.g. hotel mode), oil cooling fan(s) 36 may be driven using alternate source(s) 42 of motive power. Accordingly, even though power turbine shaft(s) 22 may be locked, alternate source(s) 42 may be used to drive oil cooling fan(s) 36 and therefore permit the operation of oil cooling fan(s) 36 during such mode(s) of operation.

An exemplary method of driving oil cooling fan(s) 36 of oil cooler(s) 34 of gas turbine engine 10 may include: driving oil cooling fan(s) 36 using motive power extracted from power turbine shaft(s) 22 of gas turbine engine 10 during a first mode of operation where power turbine shaft(s) 22 is turning; and driving oil cooling fan(s) 36 using motive power from alternate source(s) 42 during a second mode of operation where power turbine shaft(s) 22 is prevented from turning.

The first mode of operation may include a flight or taxiing mode of operation during which a main rotor of a helicopter or a propeller of a fixed-wing aircraft may be driven and permitted to spin. During this mode of operation, oil cooling fan(s) 36 may be driven from mechanical energy extracted from power turbine shaft(s) 22 via coupling device(s) 40 while alternate source(s) 42 may not be used to drive cooling fan(s) 36 and, for example, may be inoperative. In the event where alternate source(s) 42 may include electric motor(s) 42, 44, electric motor(s) 42, 44, may be free running during the first mode of operation.

The second mode of operation may be a ground (e.g. hotel) mode of operation during which a main rotor of a helicopter or a propeller of a fixed-wing aircraft may be prevented from spinning (e.g. rotor locked mode) or alternatively spinning at a reduced speed while high pressure spool(s) 20 is/are operated as an APU to power various systems of the aircraft. The option of using the high pressure spool(s) 20 of gas turbine engine 10 as an APU while power turbine shaft(s) 22 is prevented from turning may be desirable for, but not limited to, aircraft that do not have a separate and dedicated APU. During this mode of operation, oil cooling fan(s) 36 may be decoupled from power turbine shaft(s) 22 via coupling device(s) 40 and alternate source(s) 42 may be used to drive cooling fan(s) 36. In the event where alternate source(s) 42 may include electric motor(s) 42, 44, electric motor(s) 42, 44 may be driven using power extracted from high pressure spool(s) 20 (e.g. from high pressure turbine(s) 21) of gas turbine engine 10 via a generator, or, from other suitable source(s) either onboard (e.g. battery(ies)) or offboard (e.g. ground support equipment) the aircraft.

The use of electric motor(s) 42, 44 as alternate source(s) 42 may permit the output of electric motor(s) 42, 44 to be controlled (e.g. modulated) based on a cooling load on oil cooler(s) 34. Accordingly, the output speed of electric motor(s) 42, 44 may be modulated to control a speed of oil cooling fan(s) 36 as desired or necessary to meet the cooling load on oil cooler(s) 34. For example, a suitable controller could be configured to adjust the speed of electric motor(s) 42, 44 based on the temperature of the oil circulating through the oil system or oil cooler(s) 34 of gas turbine engine 10. Alternatively, electric motor(s) 42, 44 could instead or in addition be turned on/off as needed during operation of gas turbine engine 10 in the second (e.g. hotel) mode of operation.

Since the power turbine shaft(s) 22 may be prevented from spinning during the second (e.g. hotel) mode of operation, the cooling load on oil cooler(s) 34 during hotel mode may be lower than during other modes of operation because cooling/lubrication requirements of parts associated with power turbine shaft(s) 22 may be reduced. Accordingly, alternate source(s) 42 may only be required to provide motive power necessary to meet a cooling load on oil cooler(s) 34 that is lower than during modes of operation other than hotel mode. Also, since alternate source(s) 42 of motive power may only be required during hotel mode (e.g. on the ground), it may not be necessary (depending on certification requirements) to provide redundancy for alternate source(s) 42. In some applications, the improvement in overall efficiency of gas turbine engine 10 associated with driving oil cooling fan(s) 36 using power turbine shaft(s) 22 instead of high pressure spool(s) 20 during modes of operation other than hotel mode may outweigh any increase in weight/size associated with the presence of alternate source(s) 42. Further, it is understood that alternate source(s) 42 of motive power may be an existing source normally used to power other accessories/systems of gas turbine engine 10 and/or aircraft, or alternatively, alternate source(s) 42 could be dedicated for the purpose of driving oil cooling fan(s) 36 when required.

The above description is meant to be exemplary only, and one skilled in the art will recognize that changes may be made to the embodiments described without departing from the scope of the invention disclosed. For example, it is understood that systems and methods as described herein could be implemented on new gas turbine engines or could be retrofitted to existing gas turbine engines. Other modifications which fall within the scope of the present invention will be apparent to those skilled in the art, in light of a review of this disclosure, and such modifications are intended to fall within the appended claims.

What is claimed is:

1. A system for driving an oil cooling fan of a gas turbine engine, the system comprising:
   a coupling device configured to:
      transmit motive power from a power turbine shaft driven by a low pressure turbine of the gas turbine engine to the oil cooling fan during a first mode of operation where the power turbine shaft is turning, and to
      decouple the oil cooling fan from the power turbine shaft during a second mode of operation where the power turbine shaft is prevented from turning; and
   an alternate source of motive power configured to drive the oil cooling fan during the second mode of operation, the alternate source of motive power including a high pressure turbine of the gas turbine engine.

2. The system as defined in claim 1, wherein engine is an aircraft-mounted engine.

3. The system as defined in claim 1, wherein the alternate source of motive power includes an electric motor.

4. The system as defined in claim 3, wherein the electric motor is driven by a source of electricity powered by the high pressure turbine of the gas turbine engine.

5. The system as defined in claim 1, wherein an output of the alternate source of motive power is configured to be modulated based on a cooling load on an oil cooler of the gas turbine engine.

6. The system as defined in claim 1, wherein the alternate source of motive power is configured to vary the speed of the oil cooling fan based on a cooling load on an oil cooler of the gas turbine engine.

7. A gas turbine engine comprising:
   a low pressure turbine coupled to a power turbine shaft;
   an oil cooler including an oil cooling fan;
   a coupling device configured to:
      transmit motive power from the power turbine shaft of the gas turbine engine to the oil cooling fan during a first mode of operation where the power turbine shaft is turning, and to
      decouple the oil cooling fan from the power turbine shaft during a second mode of operation where the power turbine shaft is prevented from turning; and
   an alternate source of motive power configured to drive the oil cooling fan during the second mode of operation, the alternate source of motive power including a high pressure turbine of the gas turbine engine.

8. The gas turbine engine as defined in claim 7, wherein engine is an aircraft-mounted engine.

9. The gas turbine engine as defined in claim 7, wherein the alternate source of motive power includes an electric motor.

10. The gas turbine engine as defined in claim 9, wherein the electric motor is driven by a source of electricity powered by the high pressure turbine of the gas turbine engine.

11. The gas turbine engine as defined in claim 9, wherein the electric motor is configured to vary the speed of the oil cooling fan based on a cooling load on the oil cooler.

12. The gas turbine engine as defined in claim 7, wherein an output of the alternate source of motive power is configured to be modulated based on a cooling load on the oil cooler.

13. A method for driving an oil cooling fan of an oil cooler of a gas turbine engine, the method comprising:

driving the oil cooling fan using motive power extracted from a power turbine shaft driven by a low pressure turbine of the gas turbine engine during a first mode of operation where the power turbine shaft is turning; and driving the oil cooling fan using motive power from an alternate source during a second mode of operation where the power turbine shaft is prevented from turning, the alternate source of motive power including a high pressure turbine of the gas turbine engine.

14. The method as defined in claim 13, wherein the alternate source comprises an electric motor.

15. The method as defined in claim 14, comprising driving the electric motor using power extracted from the high pressure turbine of the gas turbine engine.

16. The method as defined in claim 13, comprising modulating an output of the alternate source based on a cooling load on the oil cooler.

17. The method as defined in claim 13, wherein the second mode of operation comprises a hotel mode where the power turbine shaft is locked.

\* \* \* \* \*